(12) United States Patent
Hann

(10) Patent No.: US 10,754,042 B2
(45) Date of Patent: Aug. 25, 2020

(54) DEVICE AND A METHOD FOR EXTRACTING TIMING INFORMATION FROM A RADIO SIGNAL

(71) Applicant: ADVA Optical Networking SE, Martinsried/Munich (DE)

(72) Inventor: Kenneth Hann, Espoo (FI)

(73) Assignee: ADVA OPTICAL NETWORKING SE, Martinsried/Munich (DE)

( * ) Notice: Subject to any disclaimer, the term of this patent is extended or adjusted under 35 U.S.C. 154(b) by 351 days.

(21) Appl. No.: 15/657,688

(22) Filed: Jul. 24, 2017

(65) Prior Publication Data

US 2018/0024249 A1 Jan. 25, 2018

(30) Foreign Application Priority Data

Jul. 25, 2016 (EP) ..................................... 16181001

(51) Int. Cl.
*G01S 19/22* (2010.01)
*H01Q 9/04* (2006.01)
(Continued)

(52) U.S. Cl.
CPC ............ *G01S 19/22* (2013.01); *G01S 19/428* (2013.01); *H01Q 9/045* (2013.01); *G01S 19/01* (2013.01); *G01S 19/39* (2013.01)

(58) Field of Classification Search
CPC ........ G01S 19/22; G01S 19/428; G01S 19/39; G01S 19/01; H01Q 9/045
(Continued)

(56) References Cited

U.S. PATENT DOCUMENTS

| | | | | |
|---|---|---|---|---|
| 5,014,066 A | * | 5/1991 | Counselman, III | .... G01C 15/00 342/352 |
| 5,592,471 A | | 1/1997 | Briskman | |

(Continued)

FOREIGN PATENT DOCUMENTS

| | | |
|---|---|---|
| EP | 0 942 540 A2 | 9/1999 |
| EP | 1 198 078 A2 | 4/2002 |
| EP | 2 086 055 A1 | 8/2009 |

OTHER PUBLICATIONS

Chu I-Wen et al.: "Adaptive Multipath Mitigation in Urban GNSS Positioning", GNSS 2014—Proceedings of the 27th International Technical meeting of the Satellite Division of the institute of Navigation (ION GNSS= 2014), The Institute of Navigation, 8551 Rixlew Lane Suite 360 Manassas, VA 20109, USA, Sep. 12, 2014, pp. 2713-2719, XP056007792.

(Continued)

*Primary Examiner* — Chuong P Nguyen
(74) *Attorney, Agent, or Firm* — Young & Thompson

(57) ABSTRACT

A device for producing timing information comprises equipment (101) that extracts first preliminary timing information from a first circular polarized component of a radio signal and second preliminary timing information from a second circular polarized component of the radio signal. The second circular polarized component has an opposite handedness and a time-delay with respect to the first circular polarized component. The device comprises a processing system (102) that produces the timing information based on the first preliminary timing information and/or the second preliminary timing information, and uses stored correction data for reducing the effect of the time-delay on the timing information when using the second preliminary timing information for producing the timing information. Thus, the timing information corresponds to the first preliminary timing (Continued)

information also when the timing information is produced based on the second preliminary timing information.

19 Claims, 5 Drawing Sheets

(51) Int. Cl.
*G01S 19/42* (2010.01)
*G01S 19/01* (2010.01)
*G01S 19/39* (2010.01)

(58) Field of Classification Search
USPC .......................... 342/357.61, 357.22, 357.39
See application file for complete search history.

(56) References Cited

U.S. PATENT DOCUMENTS

| | | | | |
|---|---|---|---|---|
| 5,805,200 A * | 9/1998 | Counselman, III | .... | G01C 15/00 342/156 |
| 5,995,044 A * | 11/1999 | Kunysz | ................... | G01S 19/22 342/363 |
| 6,154,173 A * | 11/2000 | Lennen | ................... | G01S 19/22 342/363 |
| 6,731,704 B1 * | 5/2004 | Kiyanagi | ................. | H04B 7/10 329/320 |
| 7,149,489 B2 * | 12/2006 | Hong | ..................... | H04B 1/406 455/269 |
| 7,171,175 B2 * | 1/2007 | Lahti | .................... | H04B 7/0822 375/349 |
| 8,396,044 B2 * | 3/2013 | Rofougaran | ............ | H04L 12/14 370/329 |
| 8,768,279 B2 * | 7/2014 | Suzuki | ................... | H04B 7/002 375/349 |
| 8,948,239 B1 * | 2/2015 | Martin | ................... | H01Q 21/28 375/224 |
| 2019/0097328 A1 * | 3/2019 | Yong | ................... | H01Q 21/245 |

OTHER PUBLICATIONS

Izadpanah A et al.: "GPS Multipath Parameterization using the Extended Kalman Filter and a Dual LHCP/RHCP Antenna", GNSS 2008—Proceedings of the 21st International Technical meeting of the Satellite Division of the Institute of Navigation (ION GNSS 2008), The Institute of navigation, 8551 Rixlew Lane Suite 360 Manassas, VA 20109, USA Sep. 19, 2008, XP056002725.
EP Search Report, dated Jan. 27, 2017, from corresponding EP 16 18 1001 application.

* cited by examiner

DEVICE AND A METHOD FOR EXTRACTING TIMING INFORMATION FROM A RADIO SIGNAL

FIELD OF THE DISCLOSURE

The disclosure relates to a device for extracting timing information from a radio signal. The radio signal can be, for example but not necessarily, a satellite radio signal transmitted by a satellite. The disclosure relates also to a method for extracting timing information from a radio signal. Furthermore, the disclosure relates to a computer program for controlling a programmable device to extract timing information from a radio signal.

BACKGROUND

In many cases there is a need to extract timing information from a received radio signal. The timing information may comprise for example a train of successive and temporally equidistant timing pulses such as e.g. a pulse per second "PPS"-signal. Furthermore, the timing information may comprise a Time-of-Day "ToD" value which represents a clock time reference that is common to two or more entities which can be, for example but not necessarily, routers and/or other network elements of a data transfer network. The received radio signal can be for example a satellite radio signal transmitted by a satellite of a Global Navigation Satellite System "GNSS" or a radio signal transmitted by a terrestrial radio station. The GNSS can be, for example but not necessarily, the US Global Positioning System "GPS" or the Russian GLONASS-satellite system.

A radio signal transmitted by a satellite of a GNSS has typically a circular polarization in which the electric field of a passing electromagnetic wave changes direction in a rotary manner. If the electromagnetic wave were frozen in time, the electric field vector of the electromagnetic wave would describe substantially a helix along the direction of propagation. The handedness, i.e. the rotational direction of the electric field vector when seen along the direction of propagation, is typically reversed when the radio signal is reflected at a surface so that the direction of arrival is sufficiently near to the perpendicular of the surface. Upon such reflection, the rotational direction of the electric field vector remains unchanged but the direction of propagation is reversed. Thus, the handedness is reversed. An inherent advantage of the circular polarization is that the reception of the radio signal is not so sensitive to the orientation of the reception antenna than in conjunction with for example a radio signal having a linear polarization.

When extracting timing information from a radio signal of a GNSS, the main challenge is typically the multi-path propagation due to reflections. The multi-path propagation causes that a device for extracting timing information receives differently delayed components of a radio signal. A known solution to this problem is to use a circular polarized antenna whose reception attenuation is strongly dependent on the handedness of the circular polarization of a received radio signal. For example, in case where the GNSS transmits a radio signal having the Right Hand Circular Polarization "RHCP", the most powerful reflected components which are reflected once have the Left Hand Circular Polarization "LHCP" because the reflections typically reverse the handedness. Thus, the most powerful reflected components can be attenuated by using a Right Hand Circular Polarized "RHCP" reception antenna.

The above-mentioned approach based on a circular polarized reception antenna works well when the circular polarized reception antenna is a rooftop antenna which has a clear view of the sky. However, in an indoor environment or in a challenging outdoor environment, reflected components of a GNSS-radio signal can be stronger than a directly propagated component of the GNSS-radio signal. A challenging outdoor environment can be for example a deep urban canyon where direct visibility of GNSS satellites is rare or even impossible. The directly propagated component may have penetrated walls and/or a roof, and thus the directly propagated component may have been attenuated significantly. A reflected component may have entered a building via e.g. a window and then reflected at a wall or the floor. Thus, the attenuation of the reflected component can be significantly less than that of the directly propagated component. Therefore, in an indoor environment, the use of a circular polarized reception antenna may lead to a situation where the reflected component which may have a sufficient power is strongly attenuated by the reception antenna and, on the other hand, the directly propagated component which is received more effectively may be too weak for providing reliable timing information. The use of an antenna without circular polarization, i.e. handedness, will attenuate both left and right handed signals by a further 3 dB and additionally will require other mechanisms to mitigate multipath effects.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the invention there is provided a new device for extracting timing information from a radio signal. The radio signal can be, for example but not necessarily, a radio signal transmitted by a satellite of a Global Navigation Satellite System "GNSS" or a radio signal transmitted by a terrestrial radio station. The GNSS can be, for example but not necessarily, the US Global Positioning System "GPS" or the Russian GLONASS-satellite system.

A device according to the invention comprises equipment for extracting first preliminary timing information from a first circular polarized component of the radio signal and for extracting second preliminary timing information from a second circular polarized component of the radio signal, where the second circular polarized component of the radio signal has an opposite handedness and a time-delay with respect to the first circular polarized component of the radio signal.

The device further comprises a processing system for producing the timing information based on at least one of the following: the first preliminary timing information and the second preliminary timing information.

The processing system is configured to use stored correction data based on one or more measured or estimated values of the time delay and being suitable for reducing the effect of the above-mentioned time-delay on the timing information when producing the timing information based on at least the second preliminary timing information.

The above-mentioned correction data can be based on a measured or estimated value of the time-delay. The time-delay can be measured on the basis of for example the first preliminary timing information and the second preliminary timing information. The time-delay can be estimated on the basis of for example distances from the device to surfaces which can reflect the radio signal.

The first and second circular polarized components of the radio signal can be utilized dynamically for example so that the timing information is produced based on the second preliminary timing information and the stored correction data when the second circular polarized component of the radio signal is stronger than the first circular polarized component of the radio signal, and otherwise the timing information is produced based on the first preliminary timing information.

The above-mentioned equipment may comprise for example a first circular polarized antenna for receiving the first circular polarized component, a second circular polarized antenna for receiving the second circular polarized component, and receivers connected to the circular polarized antennas. It is also possible that the above-mentioned equipment comprises a single antenna for receiving both the first and second circular polarized components and a hybrid circuit connected to the antenna and for separating the first and second circular polarized components from each other and for supplying the first and second circular polarized components to respective receivers.

In an exemplifying and non-limiting case where a device according to the invention is a satellite receiver module, the first circular polarized component can be a directly propagated component of a satellite radio signal and the second circular polarized component can be a reflected component of the satellite radio signal. The time-delay that is the basis of the correction data can be measured advantageously when a satellite or a group of satellites is in a position such that also the directly propagated component is sufficiently strong. The power level of the directly propagated component can be monitored, the time-delay can be measured simultaneously when monitoring the power level, and the correction data based on the measured time-delay can be stored at each time when the monitored power level exceeds the power level corresponding to the previously stored correction data. Therefore, in this exemplifying case, the stored correction data is based on a time-delay which is measured when the power level of the directly propagated component has its so far maximum. The second preliminary timing information based on the reflected component of the satellite radio signal has the time-delay because of its longer propagation path. This time-delay is compensated for from the produced timing information with the aid of the stored correction data. Thus, the timing information corresponds substantially to the directly propagated component of the satellite radio signal also when the timing information is produced on the basis of the reflected component of the satellite radio signal which can be, during many time periods, stronger than the directly propagated component of the satellite radio signal.

In an exemplifying case where radio signals transmitted by different satellites of a satellite system or by different terrestrial stations are distinguishable from each other, the radio signals received from many satellites or from many terrestrial stations can be utilized for example so that the time-delay between the directly propagated and reflected components is measured for each of the radio signals, and preliminary timing information based on each reflected component is adjusted with the aid of corresponding correction data based on the corresponding measured time-delay when the preliminary timing information based on the reflected component under consideration is used for producing the timing information. It is also possible that the first preliminary timing information is formed based on an aggregate of first circular polarized e.g. RHCP components related to many satellites or terrestrial stations and the second preliminary timing information is formed based on an aggregate of second circular polarized e.g. LHCP components related to these similar or same satellites or terrestrial stations.

The number of satellites or terrestrial stations whose radio signals have to be received depends on the type of the timing information needed. In principle, a radio signal from a single satellite or terrestrial station suffices in cases where the timing information needs to be only a train of equidistant timing pulses such as e.g. a pulse per second "PPS"-signal whose phase difference with respect to the clock of the satellite or terrestrial station has to be stable but the value of the phase difference is not needed, but typically the accuracy can be improved when radio signals are received from more than one satellite or terrestrial station. For a producing the Time-of-Day "ToD" value in a case where the location of the device according to the invention is not known, radio signals from many, typically at least four, satellites or terrestrial stations need to be received. In a case where radio signals are available from more satellites or terrestrial stations than needed, the selection of the satellites or terrestrial stations can be based on for example the power levels and/or signal-to-noise ratios "SNR" of the received radio signals.

In accordance with the invention there is provided also new method for extracting timing information from a radio signal. A method according to the invention comprises:

extracting first preliminary timing information from a first circular polarized component of the radio signal, extracting second preliminary timing information from a second circular polarized component of the radio signal, the second circular polarized component of the radio signal having an opposite handedness and a time-delay with respect to the first circular polarized component of the radio signal, producing timing information based on at least one of the following: the first preliminary timing information and the second preliminary timing information, and using stored correction data based on one or more measured or estimated values of the time delay and being suitable for reducing the effect of the time-delay on the timing information when producing the timing information based on at least the second preliminary timing information.

In accordance with the invention, there is provided also a new computer program for controlling a device that comprises:

equipment for extracting first preliminary timing information from a first circular polarized component of a radio signal and for extracting second preliminary timing information from a second circular polarized component of the radio signal, the second circular polarized component of the radio signal having an opposite handedness and a time-delay with respect to the first circular polarized component of the radio signal, and a programmable processing system, A computer program according to the invention comprises computer executable instructions for controlling the programmable processing system to:

produce timing information based on at least one of the following: the first preliminary timing information and the second preliminary timing information, and use stored correction data based on one or more measured or estimated values of the time delay and being suitable for reducing the effect of the time-delay on the timing information when producing the timing information based on at least the second preliminary timing information.

In accordance with the invention, there is provided also a new computer program product. The computer program product comprises a non-volatile computer readable medium, e.g. a compact disc "CD", encoded with a computer program according to the invention.

A number of exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of un-recited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

Exemplifying and non-limiting embodiments of the invention and their advantages are explained in greater detail below in the sense of examples and with reference to the accompanying drawings, in which.

DESCRIPTION OF EXEMPLIFYING EMBODIMENTS

The specific examples provided in the description below should not be construed as limiting the scope and/or the applicability of the accompanied claims. Lists and groups of examples provided in the description are not exhaustive unless otherwise explicitly stated.

Figure 1A:
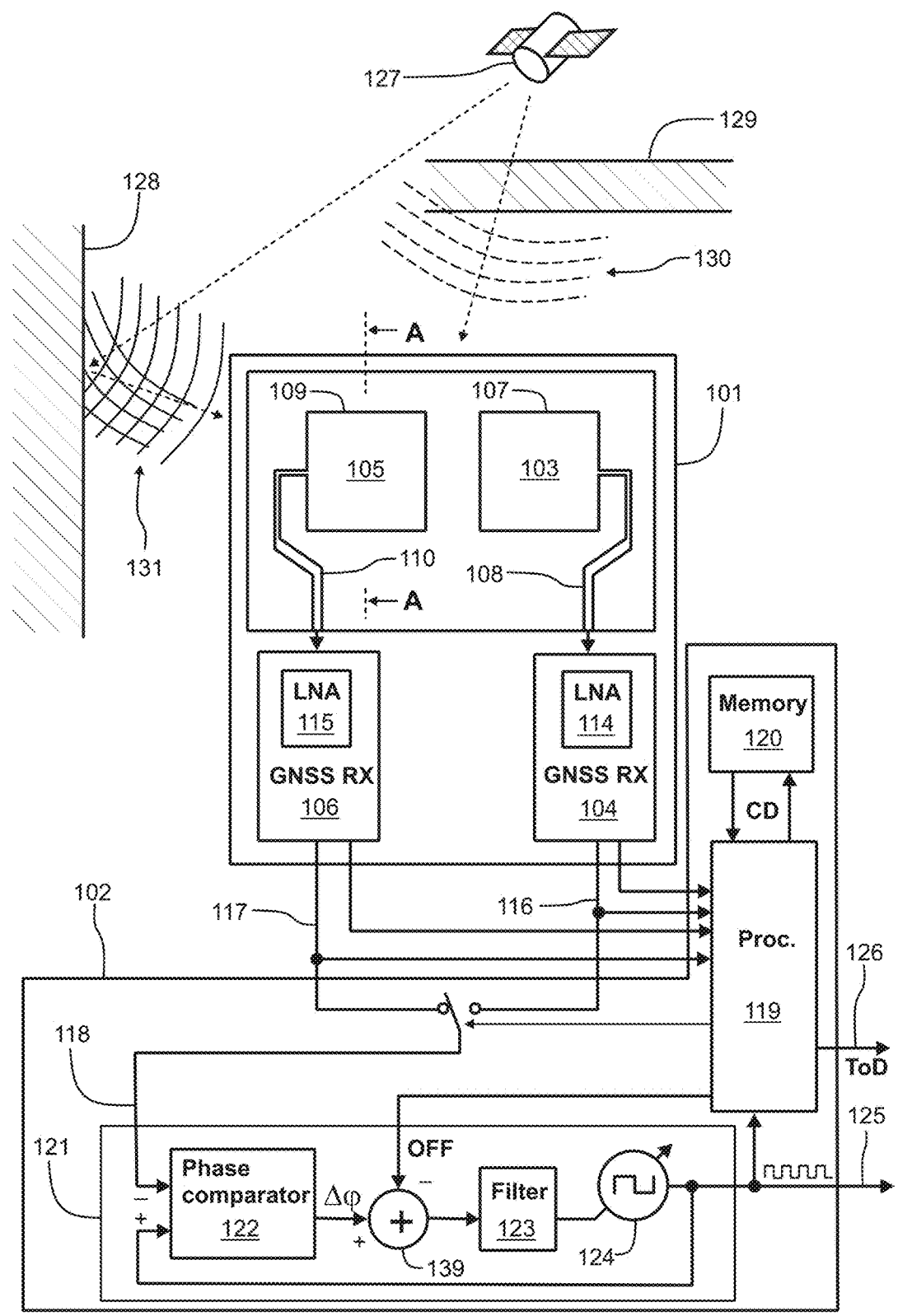
FIGS. 1a and 1b illustrate a device according to an exemplifying and non-limiting embodiment of the invention for extracting timing information from a radio signal.

FIG. 1a shows a schematic illustration of a device according to an exemplifying and non-limiting embodiment of the invention for extracting timing information from a radio signal. In the exemplifying situation shown in FIG. 1a, the radio signal is transmitted by a satellite 127 of a Global Navigation Satellite System "GNSS". The GNSS can be, for example but not necessarily, the US Global Positioning System "GPS" or the Russian GLONASS-satellite system. The device comprises equipment 101 for extracting first preliminary timing information 116 from a first circular polarized component 130 of the radio signal and for extracting second preliminary timing information 117 from a second circular polarized component 131 of the radio signal. In the exemplifying situation shown in FIG. 1a, the first circular polarized component 130 is a directly propagated GNSS-radio signal and the second circular polarized component 131 is a reflected GNSS-radio signal. Without limiting generality it can be assumed for example that the first circular polarized component 130 has the Right Hand Circular Polarization "RHCP" and the second circular polarized component 131 has the Left Hand Circular Polarization "LHCP". In the exemplifying situation shown in FIG. 1a, the first circular polarized component 130 has penetrated a mechanical structure 129 which can be e.g. a roof of a building and the second circular polarized component 131 has reflected at a mechanical structure 128 which can be e.g. a wall of a building. Depending on the properties of the mechanical structures 128 and 129, the reflected second circular polarized component 131 can be stronger than the directly propagated first circular polarized component 130.

Figure 1B:
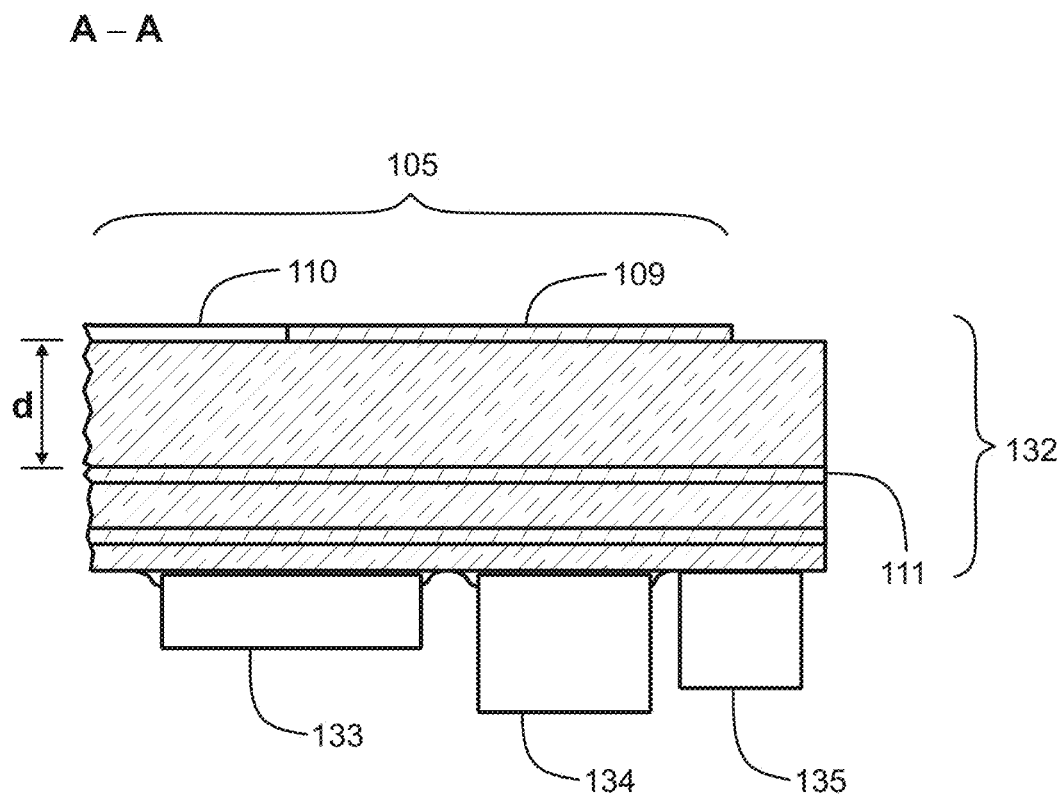

In the exemplifying device illustrated in FIG. 1a, the equipment 101 comprises a first circular polarized antenna 103, a first GNSS-receiver 104, a second circular polarized antenna 105, and a second GNSS-receiver 106. The GNSS-receiver 104 is configured to receive, from the circular polarized antenna 103, a first electric signal corresponding to the first circular polarized component 130 and to extract the first preliminary timing information 116 from the first electric signal. The GNSS-receiver 106 is configured to receive, from the circular polarized antenna 105, a second electric signal corresponding to the second circular polarized component 131 and to extract the second preliminary timing information 117 from the second electric signal. The GNSS-receiver 104 comprises a Low Noise Amplifier "LNA" 114 for amplifying the first electric signal, and the GNSS-receiver 106 comprises a Low Noise Amplifier "LNA" 115 for amplifying the second electric signal. The circular polarized antenna 103 comprises a first micro-strip patch 107, a first micro-strip line 108 connecting the first micro-strip patch 107 to the GNSS-receiver 104, and a first ground plane a distance apart from and parallel with the first micro-strip patch 107. The first ground plane is not shown in FIG. 1a. The circular polarized antenna 105 comprises a second micro-strip patch 109, a second micro-strip line 110 connecting the second micro-strip patch 109 to the GNSS-receiver 106, and a second ground plane a distance apart from and parallel with the second micro-strip patch 109. The second ground plane is illustrated in FIG. 1b which shows a view of a section taken along a line A-A shown in FIG. 1a. In FIG. 1b, the second ground plane is denoted with a reference 111 and the distance between the micro-strip patch 109 and the ground plane 111 is denoted by d. As can be seen from FIG. 1b, the micro-strip patch 109 and the micro-strip line 110 are conductors on a first surface of a circuit board 132 and the ground plane 111 is an intermediate conductor layer of the circuit board 132. The electrically insulating portions of the circuit board 132 can be made of for example FR4 which may comprise e.g. epoxy resin, woven glass fabric reinforcement, and brominated flame retardant.

In the exemplifying situation shown in FIG. 1a, the second circular polarized component 131 has a time-delay, i.e. a time-lag, with respect to the first circular polarized component 130. The time-delay is due to the fact that the propagation path of the reflected second circular polarized component 131 is longer than that of the directly propagated first circular polarized component 130. The device comprises a processing system 102 which is schematically illustrated in FIG. 1a. The processing system 102 comprises a processor 119 configured to measure the time-delay on the basis of the second preliminary timing information 117 and the first preliminary timing information 116. The processor 119 is configured to store, to a memory 120, correction data CD that is based on the measured time-delay. The processing system 102 comprises a phase-locked loop "PLL" 121 for producing timing information 125 on the basis of the first preliminary timing information 116 or on the basis of the second preliminary timing information 117. Thus, an input signal 118 of the PLL 121 is either the first preliminary timing information 116 or the second preliminary timing information 117. The timing information 125 is a train of successive and temporally equidistant timing pulses such as e.g. a pulse per second "PPS"-signal. The PLL 121 comprises a phase comparator 122 for producing a phase difference $\Delta\varphi$ between the timing information 125 and the input signal 118. The PLL 121 further comprises a loop filter 123, a controllable oscillator 124, and a summation element 139 for changing the phase difference $\Delta\varphi$ with an offset OFF. In addition to the first and second preliminary timing information 116 and 117, the GNSS-receivers 104 and 106 may deliver to the processor 119 other information indicative of a common clock time. The processor 119 can be configured to produce a Time-of-Day "ToD" signal 126 on the basis of the above-mentioned other information and the timing information 125.

In a device according to an exemplifying and non-limiting embodiment of the invention, the processing system 102 is configured to monitor the power levels of the first and second circular polarized components 130 and 131 and produce the timing information 125 based on the second preliminary timing information 117 and the stored correction data CD when the power level of the second circular polarized component 131 is greater than the power level of the first circular polarized component 130. The processing system 102 is configured to produce the timing information 125 based on the first preliminary timing information 116 when the power level of the second circular polarized component 131 is less than the power level of the first circular polarized component 130.

In a case where the timing information 125 is produced on the basis of the second preliminary timing information 117 i.e. the input signal 118 of the PLL 121 is the second preliminary timing information 117, the processor 119 sets the offset OFF to be the stored correction data CD. The correction data CD can be the value of the measured time-delay. In this exemplifying case, the PLL 121 controls the phase of the timing information 125 to advance the phase of the second preliminary timing information 117 so much that the phase difference $\Delta\varphi$, when measured as time, is substantially equal to the stored value of the measured time-delay.

In a case where the timing information 125 is produced on the basis of the first preliminary timing information 116 i.e. the input signal 118 of the PLL 121 is the first preliminary timing information 116, the processor 119 sets the offset OFF to zero.

The time-delay that is the basis of the correction data CD is measured advantageously when the satellite 127 is in a position such that also the directly propagated first circular polarized component 130 is sufficiently strong. In a device according to an exemplifying and non-limiting embodiment of the invention, the processor 119 is configured to monitor the power level of the first circular polarized component 130, measure the time-delay simultaneously when monitoring the power level, and store the correction data CD based on the measured time-delay at each time when the monitored power level exceeds the power level corresponding to the previously stored correction data. Thus, the stored correction data CD is based on a time-delay which is measured when the power level of the first circular polarized component 130 has its so far maximum.

In a device according to an exemplifying and non-limiting embodiment of the invention, the processor system 102 is configured to do a sanity check on the measured time-delay so that the processor 119 compares the measured time-delay to a numerical range based on information entered by a user of the device and prevents a particular measured time-delay from being used as a basis for the correction data CD in response to a situation in which the measured time-delay is outside the numerical range. The numerical range can be based on an estimated length difference between the propagating paths of the first and second circular polarized components 130 and 131. For example, if the estimated length difference is about 100 m, the measured delay should not be more than about 400 ns.

As mentioned earlier with reference to FIG. 1b, the micro-strip patch 109 and the micro-strip line 110 of the circular polarized antenna 105 are conductors on the first surface of the circuit board 132. In a device according to an exemplifying and non-limiting embodiment of the invention, electrical components constituting the GNSS-receivers 104 and 106 and the processing system 102 are placed on the second side of the circuit board 132. In FIG. 1b, three of the electrical components constituting the GNSS-receivers 104 and 106 and the processing system 102 are denoted with references 133, 134, and 135. The other circular polarized antenna 103 can be implemented on the first surface of the circuit board 132 or on a separate other circuit board. The processor 119 which is schematically illustrated in FIG. 1a may comprise one or more processor circuits each of which can be a programmable processor circuit provided with appropriate software, a dedicated hardware processor such as for example an application specific integrated circuit "ASIC", or a configurable hardware processor such as for example a field programmable gate array "FPGA". The memory 120 may comprise one or more memory circuits such as e.g. random access memory "RAM" circuits.

Figure 2A:
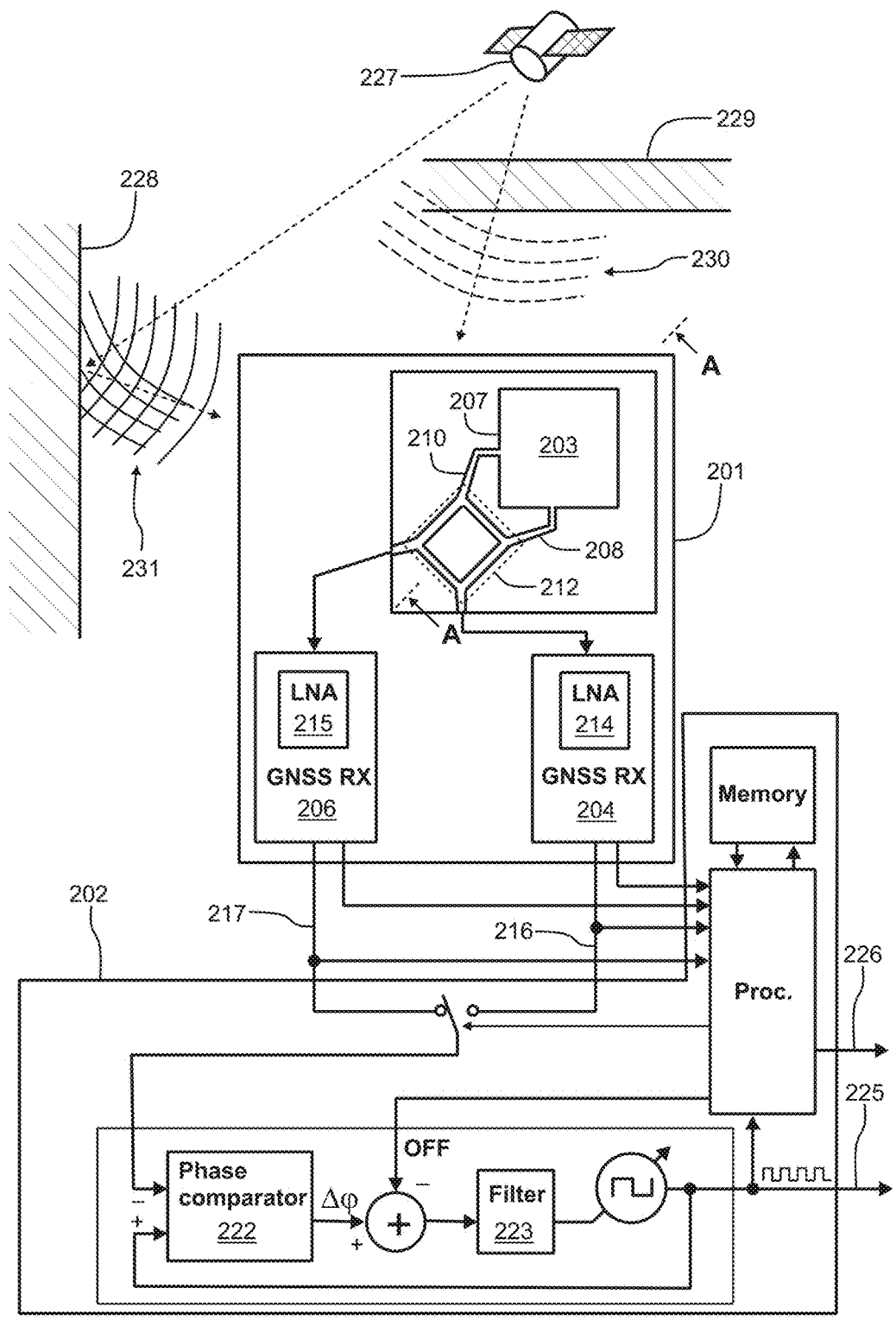
FIGS. 2a and 2b illustrate a device according to another exemplifying and non-limiting embodiment of the invention for extracting timing information from a radio signal.

FIG. 2a shows a schematic illustration of a device according to an exemplifying and non-limiting embodiment of the invention for extracting timing information from a radio signal. In the exemplifying situation shown in FIG. 2a, the radio signal is transmitted by a satellite 227 of a GNSS. The device comprises equipment 201 for extracting first preliminary timing information 216 from a first circular polarized component 230 of the radio signal and for extracting second preliminary timing information 217 from a second circular polarized component 231 of the radio signal. In the exemplifying situation shown in FIG. 2a, the first circular polarized component 230 is a directly propagated GNSS-radio signal and the second circular polarized component 231 is a reflected GNSS-radio signal. In the exemplifying situation shown in FIG. 2a, the first circular polarized component 230 has penetrated a mechanical structure 229 which can be e.g. a roof of a building and the second circular polarized component 231 has reflected at a mechanical structure 228 which can be e.g. a wall of a building.

Figure 2B:
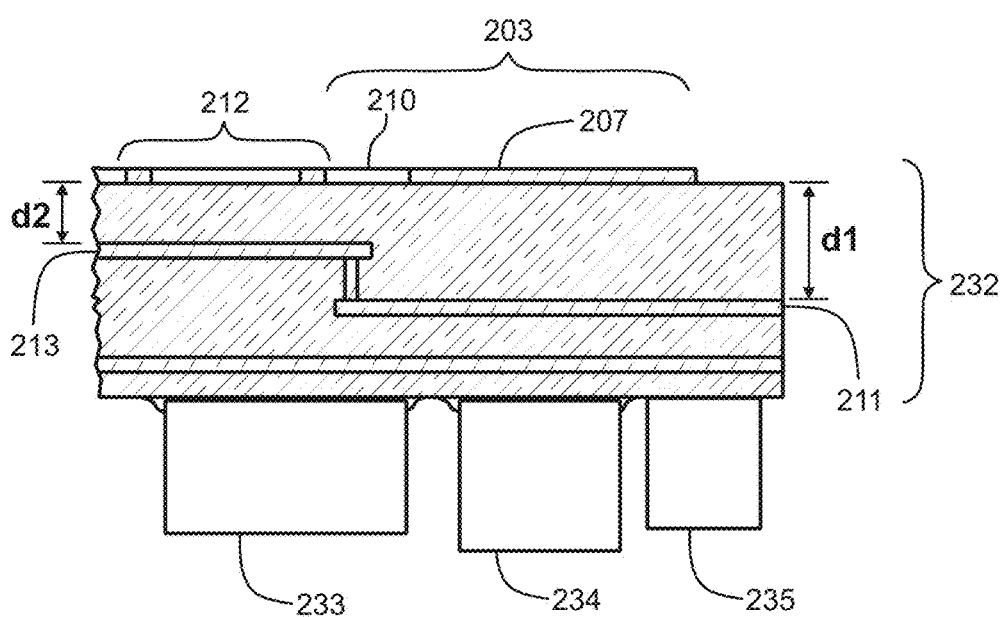

In the exemplifying device illustrated in FIG. 2a, the equipment 201 comprises an antenna 203, a hybrid circuit 212, a first GNSS-receiver 204, and a second GNSS-receiver 206. The antenna 203 is suitable for receiving both the first and second circular polarized components 230 and 231. The GNSS-receiver 204 is connected to a first branch of the hybrid circuit 212, and the GNSS-receiver 206 is connected to a second branch of the hybrid circuit 212. The hybrid circuit 212 splits the signal received by the antenna 203 so that the GNSS-receiver 204 receives a first electric signal corresponding substantially to the first circular polarized component 230 and the GNSS-receiver 206 receives a second electric signal corresponding substantially to the second circular polarized component 231. The GNSS-receiver 204 is configured to extract the first preliminary timing information 216 from the first electric signal, and the GNSS-receiver 206 is configured to extract the second preliminary timing information 217 from the second electric signal. The GNSS-receiver 204 comprises a Low Noise Amplifier "LNA" 214 for amplifying the first electric signal, and the GNSS-receiver 206 comprises a Low Noise Amplifier "LNA" 215 for amplifying the second electric signal. The antenna 203 comprises a micro-strip patch 207, a first micro-strip line 208 connecting the micro-strip patch 207 to the hybrid circuit 212, and a second micro-strip line 210 connecting the micro-strip patch 207 to the hybrid circuit 212. The antenna 203 further comprises a first ground plane that is a first distance apart from and parallel with the micro-strip patch 207. In this exemplifying case, the hybrid circuit 212 comprises four micro-strip lines constituting a quadrangle whose first corner is connected to the first micro-strip line 208, second corner is connected to the second micro-strip line 210, third corner is connected to the first branch of the hybrid circuit, and the fourth corner is connected to the second branch of the hybrid circuit. It is also possible that the hybrid circuit comprises curved micro-strip lines shaped to fit with shapes of other elements. The hybrid circuit 212 further comprises a second ground plane that is a second distance apart from and parallel with the four micro-strip lines. The above-mentioned first and second ground planes are illustrated in FIG. 2b which shows a view of a section taken along a line A-A shown in FIG. 2a. In FIG. 2b, the first ground plane is denoted with a reference 211, the first distance is denoted with d1, the second ground plane is denoted with a reference 213, and the second distance is denoted with d2. As shown in FIG. 2b, the second distance d2 is smaller than the first distance d1.

The device comprises a processing system 202 which is schematically illustrated in FIG. 2a. The processing system 202 can be similar to the processing system 102 explained above with reference to FIG. 1a. The processing system 202 is configured to produce timing information 225 which is a train of successive and temporally equidistant timing pulses such as e.g. a pulse per second "PPS"-signal. Furthermore, the processing system 202 can be configured to produce a Time-of-Day "ToD" signal 226.

As shown in FIG. 2b, the micro-strip patch 207 and the micro-strip lines of the antenna 203 and the micro-strip lines of the hybrid circuit 212 are conductors on a first surface of a circuit board 232. In a device according to an exemplifying and non-limiting embodiment of the invention, electrical components constituting the GNSS-receivers 204 and 206 and the processing system 202 are placed on the second side of the circuit board 232. In FIG. 2b, three of the electrical components constituting the GNSS-receivers 204 and 206 and the processing system 202 are denoted with references 233, 234, and 235.

Each of the devices described above with reference to FIGS. 1a, 1b, 2a, and 2b can be deemed to be a device that comprises:
means for extracting first preliminary timing information from a first circular polarized component of a radio signal, and
means for extracting second preliminary timing information from a second circular polarized component of the radio signal, the second circular polarized component of the radio signal having an opposite handedness and a time delay with respect to the first circular polarized component of the radio signal,
means for measuring the time-delay on the basis of the second preliminary timing information and the first preliminary timing information,
means for storing correction data based on the measured time-delay, and
means for producing the timing information based on the first preliminary timing information or based on the second preliminary timing information and the stored correction data.

In the exemplifying devices described above with reference to FIGS. 1a, 1b, 2a, and 2b, the processing systems 101 and 201 are configured to measure the time-delay. It is, however, also possible that the value of the time-delay and/or the correction data based on the value of the time delay is/are supplied to the device as one or more input parameters. The time delay can be measured with an external measurement device, or the time delay can be estimated on the basis of distances from the device to reflective surfaces which may reflect the radio signal. Furthermore, in the exemplifying devices described above with reference to FIGS. 1a, 1b, 2a, and 2b, the timing information is based on either the first preliminary timing information or on the second preliminary timing information and the stored correction data. It is, however, also possible to use both the first and second preliminary timing information and the correction data for producing the timing information. For example, it is possible to form corrected second preliminary timing information on the basis of the second preliminary timing information and the correction data, and to form the timing information on the basis of the first preliminary timing information and the corrected second preliminary timing information. For example, in a case of a train of successive and temporally equidistant timing pulses such as e.g. a pulse per second "PPS"-signal, the phase of each pulse can be an average of the phase of the respective pulse of the first preliminary timing information and the phase of the respective pulse of the corrected second preliminary timing information. Correspondingly, a Time-of-Day "ToD" value can be an average of a first preliminary ToD based on the first preliminary timing information and a second preliminary ToD based on the corrected second preliminary timing information. As it is straightforward to understand, many different variations are possible.

Figure 3:
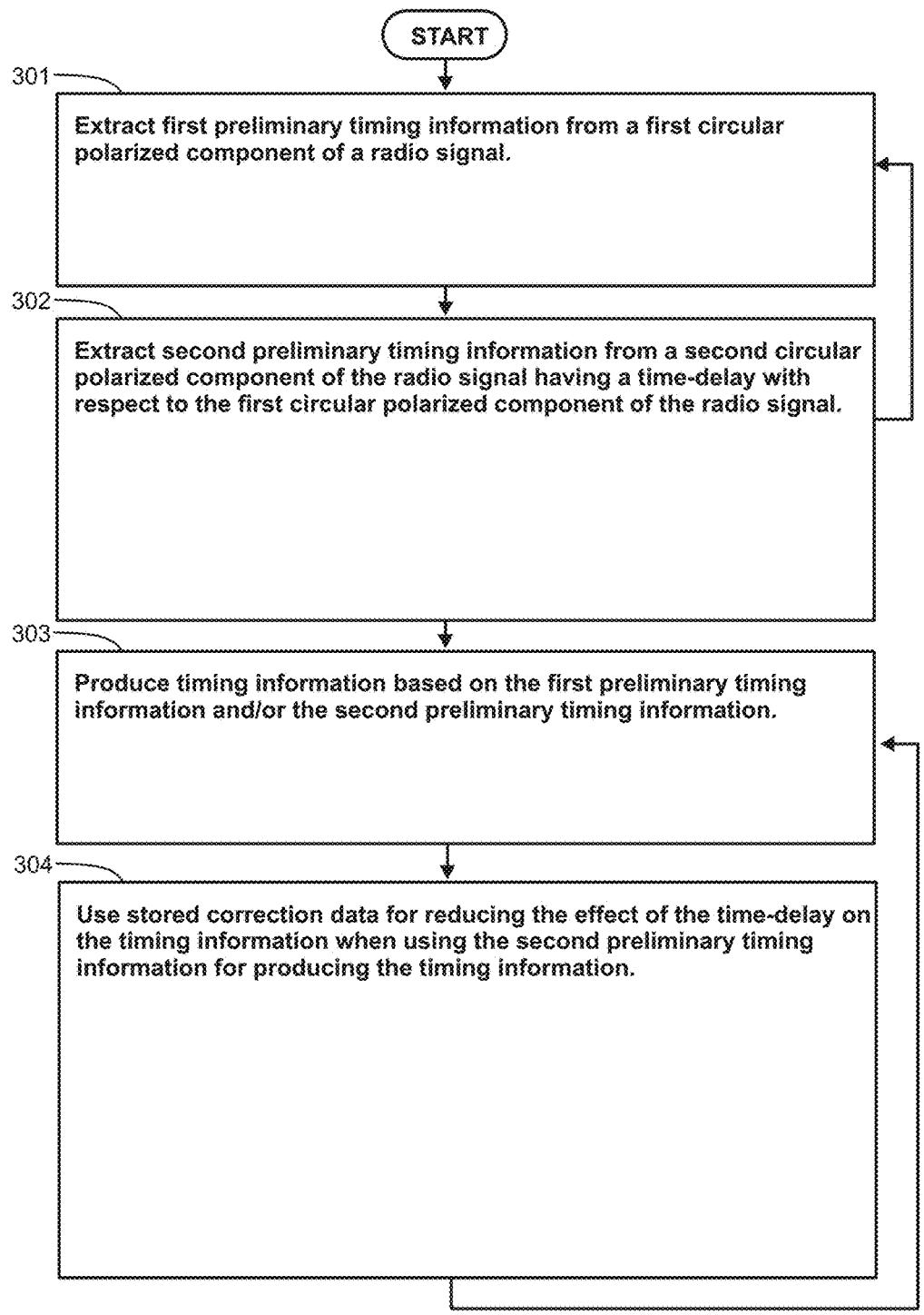
FIG. 3 shows a flowchart of a method according to an exemplifying and non-limiting embodiment of the invention for extracting timing information from a radio signal.

FIG. 3 shows a flowchart of a method according to an exemplifying and non-limiting embodiment of the invention for extracting timing information from a radio signal. The method comprises the following actions:
action 301: extracting first preliminary timing information from a first circular polarized component of the radio signal, and
action 302: extracting second preliminary timing information from a second circular polarized component of the radio signal, the second circular polarized component of the radio signal having an opposite handedness and a time-delay with respect to the first circular polarized component of the radio signal,
action 303: producing timing information based on at least one of the following: the first preliminary timing information and the second preliminary timing information, and
action 304: using stored correction data for reducing the effect of the time-delay on the timing information when producing the timing information based on at least the second preliminary timing information.

A method according to an exemplifying and non-limiting embodiment of the invention further comprises:
  measuring the time-delay on the basis of the second preliminary timing information and the first preliminary timing information, and
  forming and storing the correction data based on the measured time-delay.

In a method according to an exemplifying and non-limiting embodiment of the invention, the timing information is produced based on the second preliminary timing information and the stored correction data in response to a situation in which the power level of the second circular polarized component of the radio signal is greater than the power level of the first circular polarized component of the radio signal, and otherwise the timing information is produced based on the first preliminary timing information.

A method according to an exemplifying and non-limiting embodiment of the invention comprises monitoring the power level of the first circular polarized component of the radio signal, measuring the time-delay when monitoring the power level, and storing the correction data based on the measured time-delay at each time when the monitored power level exceeds the power level corresponding to the previously stored correction data.

A method according to an exemplifying and non-limiting embodiment of the invention comprises comparing the measured time-delay to a numerical range based on information entered by a user, and preventing the measured time-delay from being used as a basis for the correction data in response to a situation in which the measured time-delay is outside the defined numerical range.

In a method according to an exemplifying and non-limiting embodiment of the invention, the first circular polarized component of the radio signal is a directly propagated component of a satellite radio signal and the second circular polarized component of the radio signal is a reflected component of the satellite radio signal.

A computer program according to an exemplifying and non-limiting embodiment of the invention comprises computer executable instructions for controlling a programmable processing system to carry out actions related to a method according to any of the above-described exemplifying and non-limiting embodiments of the invention.

A computer program according to an exemplifying and non-limiting embodiment of the invention comprises software modules for controlling a device that comprises:
  equipment for extracting first preliminary timing information from a first circular polarized component of a radio signal and for extracting second preliminary timing information from a second circular polarized component of the radio signal, the second circular polarized component of the radio signal having an opposite handedness and a time-delay with respect to the first circular polarized component of the radio signal, and
  a programmable processing system.

The software modules comprise computer executable instructions for controlling the programmable processing system to:
  produce timing information based on at least one of the following: the first preliminary timing information and the second preliminary timing information, and
  use stored correction data for reducing the effect of the time-delay on the timing information when producing the timing information based on at least the second preliminary timing information.

The software modules can be for example subroutines or functions implemented with programming tools suitable for the programmable processing system.

A computer program product according to an exemplifying and non-limiting embodiment of the invention comprises a computer readable medium, e.g. a compact disc "CD", encoded with a computer program according to an exemplifying embodiment of invention.

A non-transitory computer readable medium, e.g. a compact disc "CD", according to an exemplifying and non-limiting embodiment of the invention is encoded with a computer program according to an exemplifying embodiment of invention.

A signal according to an exemplifying and non-limiting embodiment of the invention is encoded to carry information defining a computer program according to an exemplifying embodiment of invention.

The specific examples provided in the description given above should not be construed as limiting the scope and/or the applicability of the appended claims. Lists and groups of examples provided in the description given above are not exhaustive unless otherwise explicitly stated.

What is claimed is:

1. A device for extracting timing information from a radio signal, the device comprising:
   equipment for receiving the radio signal, for extracting first preliminary timing information from a first circular polarized component of the radio signal, and for extracting second preliminary timing information from a second circular polarized component of the radio signal, the second circular polarized component of the radio signal having a time-delay with respect to the first circular polarized component of the radio signal, and a circular polarization of the second circular polarized component of the radio signal having an opposite handedness with respect to a circular polarization of the first circular polarized component of the radio signal; and
   a processing system for producing timing information based on at least one of the first preliminary timing information and the second preliminary timing information,
   wherein the processing system is configured to use stored correction data based on one or more measured or estimated values of the time delay and being suitable for reducing an effect of the time-delay on the timing information when producing the timing information based on at least the second preliminary timing information.

2. The device according to claim 1, wherein the processing system is configured to measure the time-delay based on the second preliminary timing information and the first preliminary timing information, and to form and store the correction data based on the measured time-delay.

3. The device according to claim 2, wherein the processing system is configured to monitor a power level of the first circular polarized component of the radio signal, to measure the time-delay when monitoring the power level, and to store the correction data based on the measured time-delay at each time when the monitored power level exceeds power level corresponding to previously stored correction data.

4. The device according to claim 3, wherein the processing system is configured to compare the measured time-delay to a numerical range based on information entered by a user of the device and to prevent the measured time-delay from being used as a basis for the correction data in response to a situation in which the measured time-delay is outside the numerical range.

5. The device according to claim 3, wherein the processing system is configured to produce the timing information based on the second preliminary timing information and the stored correction data in response to a situation in which a power level of the second circular polarized component of the radio signal is greater than a power level of the first circular polarized component of the radio signal, and otherwise to produce the timing information based on the first preliminary timing information.

6. The device according to claim 2, wherein the processing system is configured to compare the measured time-delay to a numerical range based on information entered by a user of the device, and to prevent the measured time-delay from being used as a basis for the correction data in response to a situation in which the measured time-delay is outside the numerical range.

7. The device according to claim 6, wherein the processing system is configured to produce the timing information based on the second preliminary timing information and the stored correction data in response to a situation in which a power level of the second circular polarized component of the radio signal is greater than a power level of the first circular polarized component of the radio signal, and otherwise to produce the timing information based on the first preliminary timing information.

8. The device according to claim 2, wherein the processing system is configured to produce the timing information based on the second preliminary timing information and the stored correction data in response to a situation in which a power level of the second circular polarized component of the radio signal is greater than a power level of the first circular polarized component of the radio signal, and otherwise to produce the timing information based on the first preliminary timing information.

9. The device according to claim 1, wherein the processing system is configured to produce the timing information based on the second preliminary timing information and the stored correction data in response to a situation in which a power level of the second circular polarized component of the radio signal is greater than a power level of the first circular polarized component of the radio signal, and otherwise to produce the timing information based on the first preliminary timing information.

10. The device according to claim 1, wherein the equipment comprises a first circular polarized antenna, a first receiver connected to the first circular polarized antenna and for extracting the first preliminary timing information, a second circular polarized antenna, and a second receiver connected to the second circular polarized antenna and for extracting the second preliminary timing information.

11. The device according to claim 10, wherein:
the first circular polarized antenna comprises a first micro-strip patch, a first micro-strip line connecting the first micro-strip patch to the first receiver, and a first ground plane a distance apart from and parallel with the first micro-strip patch, and
the second circular polarized antenna comprises a second micro-strip patch, a second micro-strip line connecting the second micro-strip patch to the second receiver, and a second ground plane a distance apart from and parallel with the second micro-strip patch.

12. The device according to claim 1, wherein the equipment comprises an antenna for receiving the first and second circular polarized components of the radio signal, a hybrid circuit connected to the antenna, a first receiver connected to a first branch of the hybrid circuit and for extracting the first preliminary timing information, and a second receiver connected to a second branch of the hybrid circuit and for extracting the second preliminary timing information.

13. The device according to claim 12, wherein the antenna comprises a micro-strip patch, a first micro-strip line connecting the micro-strip patch to the hybrid circuit, a second micro-strip line connecting the micro-strip patch to the hybrid circuit, and a first ground plane a first distance apart from and parallel with the micro-strip patch.

14. The device according to claim 13, wherein the hybrid circuit comprises four micro-strip lines constituting a quadrangle whose first corner is connected to the first micro-strip line, second corner is connected to the second micro-strip line, third corner is connected to the first branch of the hybrid circuit, and the fourth corner is connected to the second branch of the hybrid circuit, the hybrid circuit further comprising a second ground plane a second distance apart from and parallel with the four micro-strip lines.

15. The device according to claim 14, wherein the second distance is smaller than the first distance.

16. The device according to claim 1, wherein the device is a satellite receiver module for extracting the timing information from a satellite radio signal, the first circular polarized component of the radio signal being a directly propagated component of the satellite radio signal and the second circular polarized component of the radio signal being a reflected component of the satellite radio signal.

17. A method for extracting timing information from a radio signal, the method comprising:
receiving the radio signal by means of equipment comprised of at least one antenna and receiver circuitries;
extracting, by means of said equipment, first preliminary timing information from a first circular polarized component of the radio signal;
extracting, by means of said equipment, second preliminary timing information from a second circular polarized component of the radio signal, the second circular polarized component of the radio signal having a time-delay with respect to the first circular polarized component of the radio signal, and a circular polarization of the second circular polarized component of the radio signal having an opposite handedness with respect to a circular polarization of the first circular polarized component of the radio signal;
producing, by means of a processing system, timing information based on at least one of the first preliminary timing information and the second preliminary timing information; and
using, by means of the processing system, stored correction data based on one or more measured or estimated values of the time delay and being suitable for reducing an effect of the time-delay on the timing information when producing the timing information based on at least the second preliminary timing information.

18. The method according to claim 17, further comprising:
measuring, by means of the processing system, the time-delay based on the second preliminary timing information and the first preliminary timing information; and
forming and storing, by means of the processing system, the correction data based on the measured time-delay.

19. A non-transitory computer readable medium having encoded thereon a computer program for controlling a device that includes a programmable processing system, and equipment for receiving a radio signal, for extracting first preliminary timing information from a first circular polarized component of the radio signal, and for extracting second preliminary timing information from a second circular polarized component of the radio signal, the second circular polarized component of the radio signal having a time-delay with respect to the first circular polarized component of the radio signal, and a circular polarization of the second circular polarized component of the radio signal having an opposite handedness with respect to a circular polarization of the first circular polarized component of the radio signal, the computer program comprising computer executable instructions that, upon execution by the programmable processing system, causes the device to:

produce timing information based on at least one of the first preliminary timing information and the second preliminary timing information; and use stored correction data based on one or more measured or estimated values of the time delay and being suitable for reducing an effect of the time-delay on the timing information when producing the timing information based on at least the second preliminary timing information.

\* \* \* \* \*